United States Patent
Sauntry et al.

(10) Patent No.: US 6,349,344 B1
(45) Date of Patent: Feb. 19, 2002

(54) COMBINING MULTIPLE JAVA CLASS FILES INTO A RUN-TIME IMAGE

(75) Inventors: David M. Sauntry; Michael E. Markley, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/991,500

(22) Filed: Dec. 16, 1997

(51) Int. Cl.[7] .................................................. G06F 9/54
(52) U.S. Cl. .................. 709/332; 709/1; 717/5
(58) Field of Search ........................... 709/1, 300, 301, 709/303, 11, 310–332; 717/1–10; 713/156

(56) References Cited

U.S. PATENT DOCUMENTS

| | | | | |
|---|---|---|---|---|
| 5,734,910 A | * | 3/1998 | Corrigan et al. ............. | 710/200 |
| 5,740,441 A | * | 4/1998 | Yellin et al. ................. | 395/704 |
| 5,815,718 A | * | 9/1998 | Tock ........................... | 395/705 |
| 5,892,904 A | * | 4/1999 | Atkinson et al. ....... | 395/187.01 |
| 5,966,702 A | * | 10/1999 | Fresko et al. .................. | 707/1 |
| 6,112,304 A | * | 8/2000 | Clawson ...................... | 713/156 |

OTHER PUBLICATIONS

Ladd, E., et al., "Platinum Edition Using HTML 3.2, Java 1.1, and CGI", Que Corporation, Cover, Title page, pp. 1053–1059 (1996).

Franz, M., "Run–time code generation as a central system service", Proceedings: the Sixth workshop on hot topics in operating systems (Cat. No. 97TB100133) Cape Code, MA, 112–117, (1997).

Hsieh, C.A., et al., "Java bytecode to native code translation: the Caffeine prototype and preliminary results", Proceedings of the 29th Annual IEEE/ACM Intl. Symp. on Microarchitecture Micro–29 (Cat No. 96TB100075) Paris, France, IEEE Comput. Soc. Press, USA, 90–97 (1996).

* cited by examiner

*Primary Examiner*—St. John Courtenay, III
(74) *Attorney, Agent, or Firm*—Workman, Nydegger, Seeley (57) ABSTRACT

Combining multiple Java class files into a run-time image is disclosed. The run-time image of the Java class files is such that class files are in a preloaded and preparsed state for a Java virtual machine. Desirably, the run-time image is a DLL file stored in read-only memory (ROM), and comprises non-redundant data.

46 Claims, 3 Drawing Sheets

COMBINING MULTIPLE JAVA CLASS FILES INTO A RUN-TIME IMAGE

FIELD OF THE INVENTION

This invention relates generally to Java class files, and more particularly to the combination of such files into a run-time image.

BACKGROUND OF THE INVENTION

Java is a relatively new object-oriented programming language that has become the subject of interest of many programmers. Ideally, Java is an architecture neutral and portable language, in that the same version of the program purportedly should run on any platform without modification—i.e., a computer running a version of the Microsoft Windows operating system, a computer running a version of the Apple MacOS operating system, a computer running a version of the UNIX operation system, etc., should all be able to run the same version of a Java program. That is, there are purportedly no "implementation-dependent" aspects of the Java language specification.

However, in reality, programs written in Java may not be realistically run on any platform without modification to allow for differences among different platforms, because of the inherent limitations and particularities of any given platform. For example, Microsoft Windows CE is a compact, efficient and scalable operating system that may be used in a wide variety of embedded products, from handheld PCs to specialized industrial controllers and consumer electronic devices. Many devices that utilize Microsoft Windows CE are intended to have a relatively low amount of random-access memory (RAM), such as one megabyte, to ensure that the devices remain low in cost, compact in size, and efficient in the usage of power. Further, devices designed to utilize Microsoft Windows CE typically have less powerful processors than what is typically found on computers designed to run more powerful operating systems like Microsoft Windows NT.

The nature of Java, however, is not necessarily consistent with the running of Java-written programs in such environments as Microsoft Windows CE. Java is both a compiled and an interpreted language. Java source code is turned into simple binary instructions—called Java byte codes or J-code—much like ordinary microprocessor machine code. However, whereas C or C++ source code is refined to native instructions for a particular processor, Java source code is compiled into a universal format, instructions for what is known as a Java virtual machine.

The Java virtual machine thus is a native program running within an operating system to interpret and execute Java byte code. The fundamental unit of Java code is the class. As in other object-oriented languages, classes are application components that hold executable code and data. Compiled Java classes are distributed in a universal binary format that contains Java byte code and other class information. Classes may be maintained discretely and stored in files or archives on a local system or on a network server. Typically, classes are loaded and parsed dynamically at run-time, if they are needed by an application.

In other words, Java has been designed so that software implementations of the run-time system are able to optimize their performance by compiling byte-code to native machine code on the fly. A class file is loaded and parsed, such that it is compiled on a "just in time" basis at run-time. Thus, when a Java program is run by a Java virtual machine, there are ultimately two versions of necessary class files: the byte-code versions that initially existed prior to the running of the program, and the loaded and parsed versions when the program is first run on the Java virtual machine.

There are several disadvantages to this design of the Java programming language in the context of platforms like the Microsoft Windows CE platform that are designed for efficiency and cost, and thus may not have as much memory as and have slower processors than, for example, desk-top computers running Microsoft Windows NT. First, the typical Java program uses many class files, such that loading and parsing these class files at run-time takes a long time on a less powerful processor. For example, it has been found that running a simple "Hello World" program—e.g., a program that causes the words "Hello World" to be displayed on the screen—may take more than nine minutes to execute on a handheld device having a processor running at about forty megahertz, because of the initial loading and parsing of class files at run-time.

One aspect of this initial loading and parsing is frequently the translation of the byte codes of the Java class files from big endian format to little endian format. That is, byte codes in Java class files are in big endian format such that the bytes are ordered from least significant to most significant (e.g., 0, 1, 2, 3), whereas on many platforms, little endian format is used, where bytes are to be ordered from most significant to least significant (e.g., 3, 2, 1, 0). Another aspect of this initial loading and parsing is that the Java class file format does not specify the location of a native member function, such that the virtual machine must search trough all the loaded files in a process to find the desired method.

A second distinct disadvantage ties into the fact that each Java class file contains a copy of all the data required to run that class—e.g., such as information regarding the superclasses to which the class is related. This data is often duplicated in other class files as well, wasting space unnecessarily. This is especially problematic in devices having limited amounts of RAM. For example, it has been found that in Java 1.1 (more specifically, Java Development Kit 1.1, or JDK 1.1), a simple "Hello World" program has a run-time memory footprint of over 700 kilobytes in a given handheld device, or nearly seventy percent of an available one megabyte of RAM. Such a handheld device may also require about 300 kilobytes of RAM to maintain the screen, meaning that programs greater in complexity than a simple "Hello World" program are not likely to run at all on the device.

Third, a related problem is that in a typical Java run-time system the Java class files are filed in storage. This may be RAM or read-only memory (ROM). When the Java virtual machine requires these files for execution, they are loaded into RAM and parsed, such that the resulting data are stored in RAM during execution. This means that during the running of a Java program, there are actually two versions of the needed class files stored on the machine—the unloaded and unparsed Java class files in storage (either RAM or ROM), and the loaded and parsed Java class files in RAM. For memory-constrained devices, this is burdensome.

There is a need, therefore, for a solution that overcomes these disadvantages and shortcomings of the loading and parsing of Java class files at run-time by a Java virtual machine, so that Java programs may realistically be more able to run on memory-constrained and slower platforms such as handheld devices running Microsoft Windows CE.

SUMMARY OF THE INVENTION

The above-mentioned shortcomings, disadvantages and problems are addressed by the present invention, which will be understood by reading and studying the following specification. The invention describes combining multiple Java class files into a run-time image. The run-time image of the Java class files is such that class files are in a preloaded and pre-parsed state for a Java virtual machine. Desirably, the run-time image is a DLL file stored in read-only memory (ROM), and comprises non-redundant data.

The run-time image is desirably created by a separate utility that preloads and preparses a given collection of Java class files, such that the Java virtual machine does not have to load and parse the files at run time, but instead can rely on the run-time image itself. Desirably, this includes translating the byte codes of the Java class files from big endian format to little endian format, and also creating import records such that native member function data structures point thereto, permitting faster native member function resolution.

The invention therefore provides for advantages not found in the prior art. First, because the Java class files are preloaded and pre-parsed in the run-time image, the fact that the Java virtual machine does not have to load and parse them at run-time means that execution of Java programs is performed much more quickly. For example, it has been found that running a simple "Hello World" program takes less than a second to execute on a handheld device having a processor running at about forty megahertz, as compared to more than nine minutes on the same device where the virtual machine must first load and parse the necessary class files.

Second, because desirably redundant data is eliminated when combining the loaded and parsed class files into a single DLL file, scarce space in memory is conserved. For example, it has been found that in Java 1.1.3 (more specifically, Java Development Kit 1.1.3, or JDK 1.1.3), a thirty-percent reduction in size of the run-time image file as compared to the prior art loading and parsing of class files at run time may be achieved in some instances.

Third, the run-time image is the only version of the Java class files that is needed within a given device. Furthermore, this only version is desirably stored in ROM, and not random-access memory (RAM). Thus, where in the prior art two versions of the class files exist, the first in an unloaded and unparsed state, and the second in a loaded and parsed state at run-time, and where often these two versions of the class files both exist in RAM by comparison, under the invention, there is only one version of the class files (just the loaded and parsed version), which desirably exists in ROM. This saves scarce RAM.

The present invention describes devices, computers, computer-readable media, and systems of varying scope. In addition to the aspects and advantages of the present invention described here, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level description of one embodiment of the invention is presented, compared to a prior art system. In the third section, methods for an embodiment of the invention are provided. In the fourth section, a conclusion of the detailed description is described.

Hardware and Operating Environment

Figure 1:
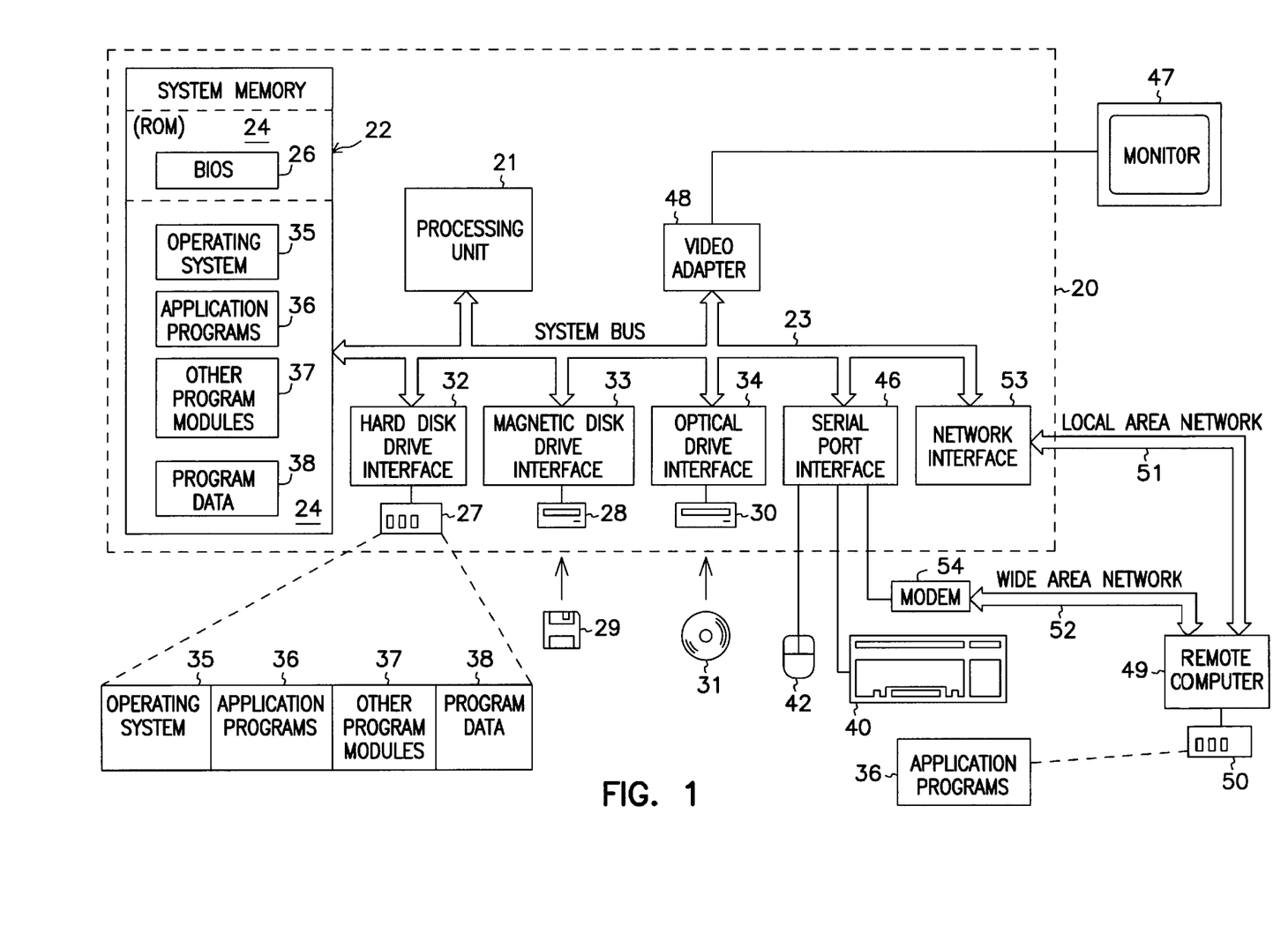
FIG. 1 is a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, such as those running Microsoft Windows CE, multiprocessor systems, microprocessor-based or programmable consumer electronics, network PCs, minicomputers, mainframe computers, PCs running Microsoft Windows NT, and the like. The invention may also be practiced in distributed computing environments where tasks are performed by remote processing devices that are linked through a communications network. In a distributed computing environment, program modules may be located in both local and remote memory storage devices.

The hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Description

Figure 2A:
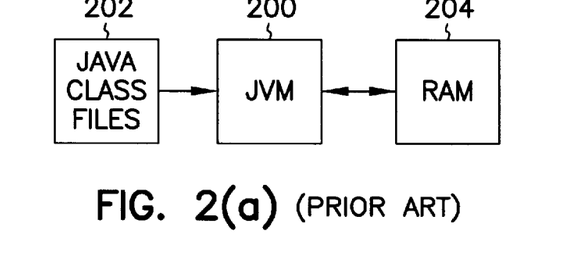
FIGS. 2(a) and 2(b) are diagrams illustrating a system according to one embodiment of the invention as compared to a prior art system; and, FIGS. 3(a) and 3(b) are flowcharts of methods in accordance with an embodiment of the invention.
Figure 2B:
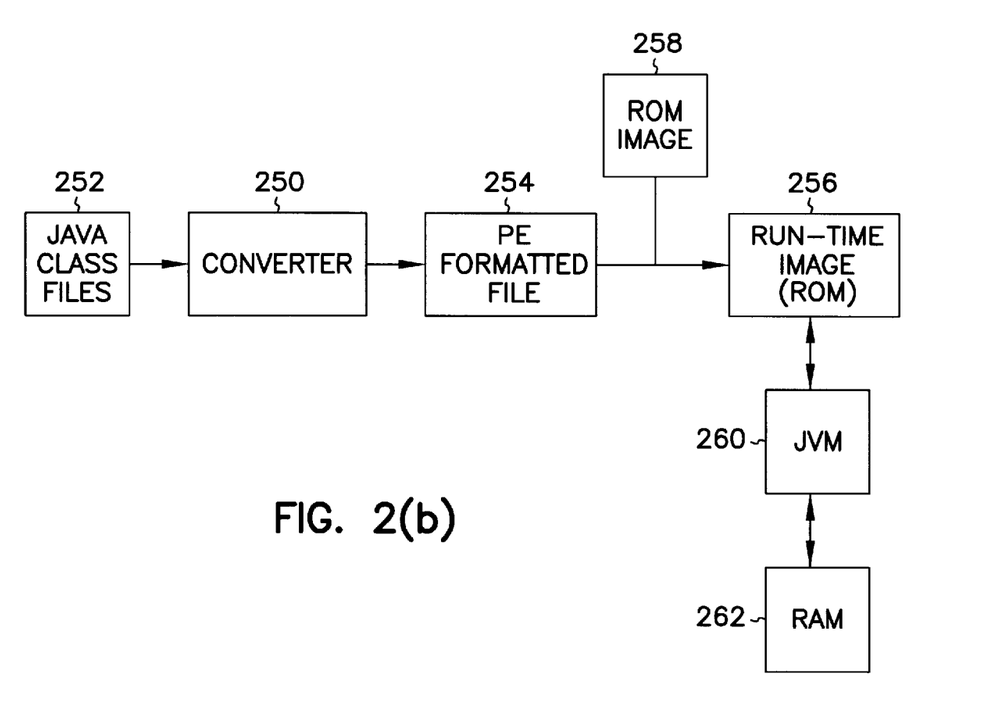

A system level description of the operation of an embodiment of the invention, as compared to the operation of a prior art system, is presented by reference to FIGS. 2(a)–2(b). A diagram of a system in which a Java virtual machine loads and parses Java class files into random-access memory (RAM) per the prior art, and as known in the art, is shown in FIG. 2(a), while a diagram of a system in which Java class files are pre-parsed and preloaded into a ran-time image in read-only memory (ROM), for reliance by a Java virtual machine when running a Java program, according to one embodiment of the invention, is shown in FIG. 2(b).

Referring first to FIG. 2(a), in accordance with the prior art at run-time the Java virtual machine 200 loads and parses the Java class files 202 into RAM 204. The Java class files 202 are those class files including those that are necessary for the execution of a given Java program. In general, with the release of Java 1.1 and subsequent versions (i.e., Java Development Kit 1.1, or JDK 1.1), it has been determined that upwards of at least about 160 to 190 of such Java class files are required for the execution of even simple programs such as a "Hello World" program. The Java class files 202 are stored in a storage, such as RAM (different from the RAM 204 to which the parsed and loaded Java class files are stored), read-only memory (ROM), or a storage device such as a hard disk drive.

The structure of Java class files has been described generally in the background section; the construction and format of such class files are known in the art. In particular, each Java class file is typically denoted by a class suffix designation, and are compiled byte code. Each Java class file is transferred separately; all classes used in a Java applet or application reside in their own separate class file. The class file is a series of eight bytes. Sixteen and thirty-two bit values are formed by reading two or four of these bytes and joining them together. Each class file contains a magic constant, major and minor version information, a constant pool, information about the class, information about each of the fields and methods in the class, and debugging information. The constant pool is how various constant information about the class is stored, and can be a unicode string, a class or interface name, a reference to a field or method, a numeric value, or a constant string value. Further information regarding Java class files is described in the reference [name], pages 1053–1059, which is hereby incorporated by reference.

The Java virtual machine 200 is a native program running within an operating system, such as Microsoft Windows CE, to interpret and execute a Java program that has been previously compiled into Java byte code. The Java virtual machine is also referred to as the Java run-time interpreter. At the run-time execution of a Java program, the Java virtual machine 200 loads and parses the Java class files 202, and stores the Java class files as loaded and parsed into RAM 204. As has been described in the background section, under the prior art two versions of the Java class files thus exist, the original Java class files, as represented by Java class files 202, and the parsed and loaded version stored in RAM 204. The loading and parsing of Java class files is known within the art. Information regarding Java is described in the reference David Flanagan, "Java in a Nutshell: A Desktop Reference," 2d edition, 1997 (ISBN 1-56592-262-X), which is hereby incorporated by reference.

Referring next to FIG. 2(b), in accordance with one embodiment of the invention, the converter 250 loads and parses the Java class files 252 into a file 254, which is then desirably burned into ROM 256 as a run-time image (desirably, a DLL file) by a ROM imager 258. Thus, the Java virtual machine 260 does not have to load or parse any of the Java class files 252, but instead can immediately use the parsed and loaded version of the class files stored as a run-time image in ROM 256. This means that RAM 262 is conserved, and also means that Java programs execute more quickly, since less overhead needs to be performed at run-time.

The converter 250 and the ROM imager 258 are usually part of a computer, computerized system, or device separate than the computer, computerized system, or device upon which the Java virtual machine 260 is running. For example, a Microsoft Windows NT workstation may have running thereon the converter 250 and the ROM imager 258, such that the converter 250 uses the Java class files 252 as input (as stored on a storage such as a hard disk drove of the workstation), outputs the resulting file 254, which is then used by ROM imager 258 as input to bum on a ROM 256. This ROM 256 may then be set on a hardware card for insertion into a device, such as a Microsoft Windows CE handheld device, including the Java virtual machine 260 and RAM 262.

The Java class files 252 are the same as the Java class files 202 that have been previously described; that is, the Java class files 252 are those class files includes those that are necessary for the execution of a given Java program. Note that not all of the necessary Java class files for a given Java program may be a part of the Java class files 252; other Java class files may be loaded and parsed from storage to RAM 262 at run-time by the Java virtual machine 260 as has been described in FIG. 2(a). However, desirably, all of the necessary class files for a given Java program are part of the Java class files 252, for optimal execution efficiency.

The converter 250 is desirably a software tool (i.e., a computer program) that provides for the combination of class files into a single DLL file, where the DLL file is in portable executable (PE) format known in the art. The tool provides for specification of the individual class files to include (i.e., the Java class files 252), and it searches for all dependent class files along a specified path, as those of ordinary skill within the art can appreciate. Desirably, native code DLL files can also be specified for searching for native methods.

The converter 250 loads and parses class files in the same manner as does a Java virtual machine as known in the art. However, desirably one exception is that the converter allocates all relevant data structures in specific heaps, and all pointers within these data structures are tracked, as those of ordinary skill within the art can appreciate. Furthermore, desirably the converter places all strings into a single string table, and native member functions are matched to the specified DLL files (that is, DLL files can be specified to be searched for native member functions; when one is matched to a DLL file, an import record is created in the resulting DLL file, and the native member function data structure points to this record, allowing for specific and fast resolution of native member functions). Byte codes are also flipped from big endian to little endian format.

Because the converter preloads and preparses numerous class files in one session, it is desirably able to include only one copy of data that is relied upon by more than one class file, such that there is no redundant data within the DLL file 254. For example, two class files may reference the same superclass, as known within the art, such that complete information regarding this superclass is in each class file. The converter desirably only includes one copy of this complete information, such that each class refers to the same complete information regarding the superclass. This is an advantage of the present invention over the prior art, where the loading of a class file causes the loading of all the information contained therein, regardless of whether it is redundant with other information from other class files.

The resulting DLL file 254, in PE format has data sections including the heaps from all the class files 252, and native member functions references as import records, as has been described. All pointers within these sections have proper load-time relocation records, as those of ordinary skill within the art can appreciate. The file 254 is desirably burned into ROM 256 (or other nonvolatile storage device) to create a run-time image of the Java class files 252, as preloaded and pre-parsed by the converter 250. Burning into ROM is accomplished by a ROM imager 258, which is known in the art. For example, the tool romimage, which is a Windows CE OAK tool, may be used. When the DLL file is loaded, a pointer to the ROM image is obtained such that a second copy no longer has to be loaded.

The Java virtual machine 260 is desirably software executed by a processor from a computer-readable medium, such as a memory. The Java virtual machine, as known within the art, accepts a core command-line argument. This argument names the trusted (i.e., secure) core class DLL file, and defaults to jcls.dll. At run-time, the Java virtual machine does a LoadLibrary call and a GetProcAddress call to obtain a pointer to the relevant data structures, and integrates this with the existing data structures in the Java virtual machine. Thus, trusted core class DLL file is desirably the run-time image of the Java class files 252 stored in ROM 256. As new classes are requested by a Java program, the list of classes in the core class DLL file is searched, and if the new classes are found, the class initializer is executed. These classes are marked as initialized, and execution continues. This bypasses the time-consuming procedure of loading and parsing the class files at run-time, as occurs in the prior art. Note that if a new class is not found, then a normal search for the class file is started in the file system, and, if found, the class is loaded and parsed as in the prior art.

A system level overview of the operation of an embodiment of the invention has been described in relation to the prior art. The preloading and preparsing of Java class files by a converter program means that loading and parsing of the class files does not have to occur by the Java virtual machine at run-time, enabling Java programs to run more efficiently.

Furthermore, the preloading and preparsing of Java class files into a run-time image stored in ROM means that only one version of the Java class files exist—as opposed to two versions in the prior art (one in storage, and one in RAM). This conserves RAM in a device having a Java virtual machine, which may be at a premium.

Methods of an Embodiment of the Invention

In the previous section, a system level description of the operation of an embodiment of the invention was described. In this section, methods performed by a computer of such an embodiment in which a converter resides are described by reference to a series of flowcharts. The methods to be performed constitute computer programs made up of computer-executable instructions. Describing the methods by reference to a flowchart enables one skilled in the art to develop programs including instructions to carry out the methods on a suitable computer (the processor of the computer executing the instructions from computer-readable media).

Figure 3A:
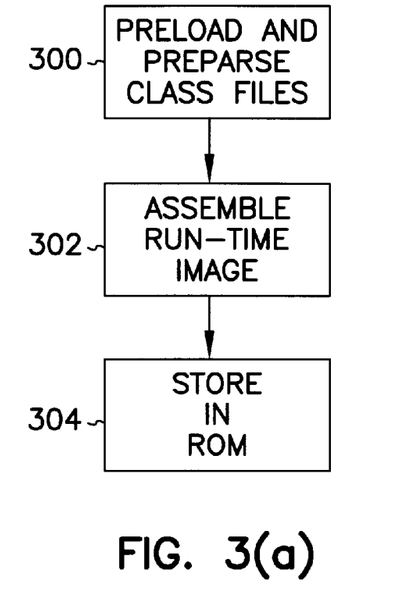

Referring first to FIG. 3(a), a flowchart of a computerized method according to an embodiment of the invention is shown. This method is inclusive of the steps or acts required to be taken by a device such as a computer to preload and preparse at least one Java class file into a run-time image stored on a nonvolatile storage device such as a ROM. In step 300, the class files are preloaded and pre-parsed as has been described in conjunction with FIG. 2(b), and which will also be described in conjunction with FIG. 3(b). In step 302, a run-time image file is generated of the class files that have been preloaded and pre-parsed, desirably a DLL file in a PE format, as has been described in conjunction with FIG. 2(b). Finally, in step 304, the run-time image—i.e., the DLL file—is burned into a non-volatile storage device such as a ROM, as has also been described in conjunction with FIG. 2(b). Thus, the computerized method comprises three main steps or acts: preloading and preparsing the class files; generating a run-time image file; and burning the run-time image file into a non-volatile storage device.

Figure 3B:
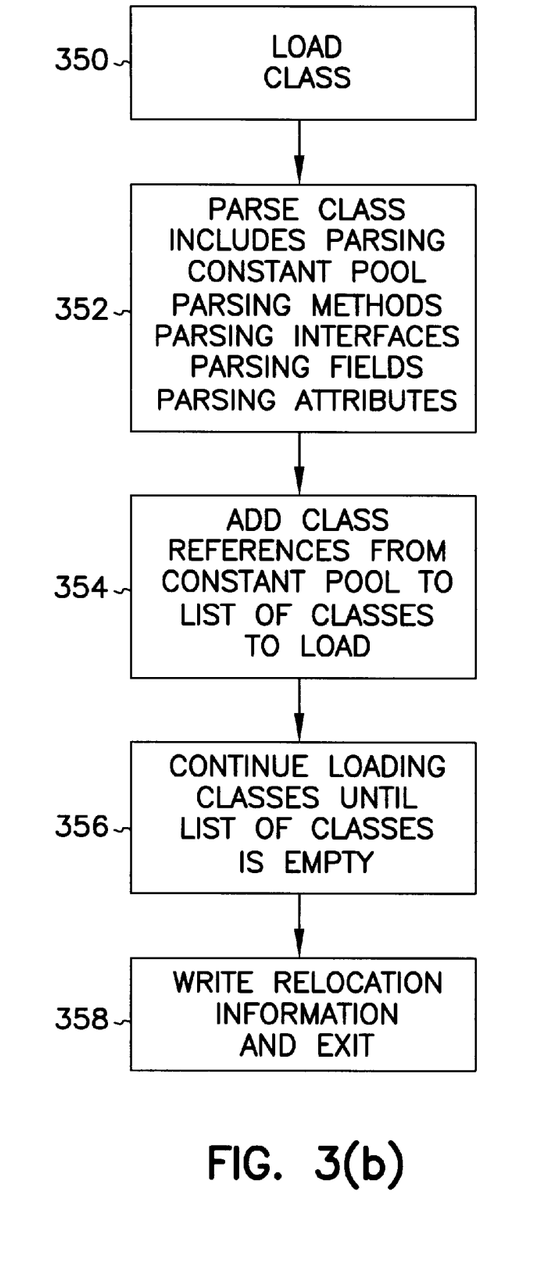

Referring next to FIG. 3(b), a flowchart of another computerized method according to an embodiment of the invention is shown. This method is inclusive of the steps or acts required to be taken by a device such as a computer to preload and preparse one Java class file. That is, the method of FIG. 3(b) is one method by which step 300 of FIG. 3(a) is performed, on each of the Java class files. Those of ordinary skill within the art will recognize that the method of FIG. 3(b) is substantially identical to the loading and parsing methodology performed by a Java virtual machine known in the art. Thus, description of the method of FIG. 3(b) is provided in sufficient detail to enable one of ordinary skill in the art to make and use the invention.

In step 350, the class from the class file is loaded, and the class is parsed in step 352. This includes parsing the constant pool, parsing the methods, parsing the fields, parsing the interfaces, and parsing the attributes of the class. The class references from the class pool are added to the list of classes to load in step 354. Then, in step 356, loading of the classes is continued until the list of classes is empty. Finally, in step 358, relocation information is written to the DLL file (which may include correcting any errors within the constant pool).

As each class file is processed by the method of FIG. 3(b), data that is encountered in a class file that is redundant with that which has been stored in a class file previously processed is not stored again. Rather, reference is made to the data previously stored, so that desirably the resulting run-time image includes only non-redundant data. Furthermore, because the Java class files typically include data in big endian format, as has been described, one aspect of the preloading and preparsing process of FIG. 3(b) is the conversion of the data in big endian format to data in little endian format.

Methods according to one embodiment of the invention have been described. The methods include the method by which a class files are preloaded and preparsed, assembled into a run-time image, and stored in ROM. The methods also include the method specifically delineating the steps or acts needed in one embodiment of the invention to actually preload and preparse a class file, substantially identical to the steps performed by a Java virtual machine when loading a class file at run-time.

CONCLUSION

Combining multiple Java class files into a run-time image has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, while the class files are being parsed during creation of the preload DLL file, Java byte code may also be compiled into native code, and this native code also stored in the DLL file. This is comparable to the just-in-time (JIT) interpretation conducted on a typical Java virtual machine, but instead would have the effect of pre-interpreting the code, so that time is not wasted later in conducting the JIT interpretation at run-time. Thus, it is manifestly intended that this invention be limited only by the following claims and equivalents thereof

We claim:

1. A method of preparing one or more class files prior to run time for use by a virtual machine in a manner so that during run time the prepared one or more class files require less memory and require less time for processing during program execution than would otherwise be required for the one or more class files, and which do not require application programs to incorporate the prepared one or more class files prior to run time to be executable by the virtual machine, the method comprising steps for:

loading the one or more class files and accounting for any differences in byte order at the virtual machine;

parsing the one or more class files into individually parsed instructions derived from the one or more class files; and creating a native executable run time image comprised of pre-loaded and pre-parsed instructions derived from the one or more class files and that are dynamically linkable in a manner so that the prepared one or more class files may be accessed during run time by any of one or more applications that may be developed separately and independently from the preparation of the one or more class files, without a need to incorporate in such applications the pre-loaded and pre-parsed instructions.

2. A method as recited in claim 1, further comprising a step for eliminating redundant data when creating the run time image.

3. A method as recited in claim 1, wherein the run time image comprises a dynamic link library.

4. A method as recited in claim 1, wherein the run time image comprises instructions in a PE format.

5. A method as recited in claim 1, further comprising a step for storing the run time image on a nonvolatile storage device.

6. A method as recited in claim 1, wherein the virtual machine includes a Java virtual machine that further comprises software executed by a processor from a computer-readable medium.

7. A method of preparing one or more class files prior to run time for use by a virtual machine in a manner so that during run time the prepared one or more class files require less memory and require less time for processing during program execution than would otherwise be required for the one or more class files, and which do not require application programs to incorporate the prepared one or more class files prior to run time to be executable by the virtual machine, the method comprising acts of:

translating the byte ordering of the one or more class files as needed to account for byte ordering at the virtual machine;

identifying information contained within the one or more class files, including information about any constants, fields, or methods defined within the one or more class files; and using the information contained within the one or more class files to create a native executable run time image comprised of a searchable library of pre-loaded and pre-parsed instruction derived from the one or more class files and that are dynamically linkable in a manner so that the prepared one or more class files may be accessed during run time by any of a plurality of applications that may be developed separately and independently from the preparation of the one ore more class files, without a need to incorporate in such applications the pre-loaded and pre-parsed instructions.

8. A method as recited in claim 7, further comprising an act of including only one copy of at least some data this is relied upon by more than one class file, such that there is no redundancy with respect to the at least some data within the run time image.

9. A method as recited in claim 7, wherein the run time image comprises a dynamic link library.

10. A method as recited in claim 7, wherein the run time image comprises instructions in a PE format.

11. A method as recited in claim 7, further comprising an act of writing the run time image to a nonvolatile storage device.

12. A method as recited in claim 7, wherein the virtual machine includes a Java virtual machine that further comprises software executed by a processor from a computer-readable medium.

13. A computer program product for implementing a method of preparing one or more class files prior to run time for use by a virtual machine in a manner so that during run time the prepared one or more class files require less memory and require less time for processing during program execution than would otherwise be required for the one or more class files, and which do not require application programs to incorporate the prepared one or more class files prior to run time to be executable by the virtual machine, the computer program product comprising a computer readable medium carrying computer executable instructions that implement the method, wherein the method comprises steps for:

loading the one or more class files and accounting for any differences in byte order at the virtual machine;

parsing the one or more class files into individually parsed instructions derived from the one or more class files; and creating a native executable run time image comprised of pre-loaded and pre-parsed instructions derived from the one or more class files and that are dynamically linkable in a manner so that the prepared one or more class files may be accessed during run time by any of one or more applications that may be developed separately and independently from the preparation of the one or more class files, without a need to incorporate in such applications the pre-loaded and pre-parsed instructions.

14. A computer program product as recited in claim 13, wherein the method further comprises a step for eliminating redundant data when creating the run time image.

15. A computer program product as recited in claim 13, wherein the run time image comprises a dynamic link library.

16. A computer program product as recited in claim 13, wherein the run time image comprises instructions in a PE format.

17. A computer program product as recited in claim 13, wherein the method further comprises a step for storing the run time image on a nonvolatile storage device.

18. A computer program product for implementing a method of preparing one or more class files prior to run time for use by a virtual machine in a manner so that during run time the prepared one or more class files require less memory and require less time for processing during program execution than would otherwise be required for the one or more class files, and which do not require application programs to incorporate the prepared one or more class files prior to run time to be executable by the virtual machine, the computer program product comprising a computer readable medium carrying computer executable instructions that implement the method, wherein the method comprises acts of:

translating the byte ordering of the one or more class files as needed to account for byte ordering at the virtual machine;

identifying information contained within the one or more class files, including information about any constants, fields, or methods defined within the one or more class files; and using the information contained within the one or more class files to create a native executable run time image comprised of a searchable library of pre-loaded and pre-parsed instruction derived from the one or more class files and that are dynamically linkable in a manner so that the prepared one or more class files may be accessed during run time by any of one or more applications that may be developed separately and independently from the preparation of the one ore more class files without a need to incorporate in such applications the pre-loaded and pre-parsed instructions.

19. A computer program product as recited in claim 18, wherein the method further comprises an act on including only one copy of at least some data this is relied upon by more than one class file, such that there is no redundancy with respect to the at least some data within the rum time image.

20. A computer program product as recited in claim 18, wherein the run time image comprises a dynamic link library.

21. A computer program product as recited in claim 18, wherein the run time image comprises instructions in a PE format.

22. A computer program product as recited in claim 18, wherein the method further comprises an act of writing the run time image to a nonvolatile storage device.

23. In a computer system having one or more program modules that include a Java virtual machine, one or more Java applications, and one or more Java class files, a method of executing at least one of the one or more Java applications without having to load and parse each and every Java class file used by the at least one Java application, thereby requiring less memory and less time for processing during program execution than would otherwise be required, and which does not require the at least one Java application to incorporate each and every Java class file prior to run time, the method comprising steps for:

determining that at least some portion of a class referenced by the at least one Java application is external to the at least one Java application;

dynamically linking the external class portion to the at least one Java application from a native executable run time image comprising pre-loaded and pre-parsed instructions, wherein the pre-loaded and pre-parsed instructions may be accessed during run time by any of the one or more Java applications as needed, thereby allowing the one or more Java applications to be developed separately and independently from the run time image; and     using pre-loaded and pre-parsed instructions from the dynamically linked external class portion during the execution of the at least one Java application.

24. A method as recited in claim 23, the method further comprising steps for:

determining that a particular portion of a particular class referenced by the at least one Java application is external to the at least one Java application;

at run time, loading at least one class file that corresponds to the particular portion of the particular class that was determined to be external to the at least one Java application and accounting for any differences in byte order at the virtual machine; and     parsing the at least one class file into individually parsed instructions derived from the one or more class files.

25. A method as recited in claim 23, wherein the run time image comprises a dynamic link library.

26. A method as recited in claim 23, wherein the run time image comprises instructions in a PE format.

27. A method as recited in claim 23, wherein the run time image is stored on a nonvolatile storage device.

28. A method as recited in claim 23, wherein the Java virtual machine comprises software executed by a processor from a computer-readable medium.

29. In a computer system having one or more program modules that include a Java virtual machine, one or more Java applications, and one or more Java class files, a method of executing at least one of the one or more Java applications without having to load and parse each and every Java class file used by the at least one Java application, thereby requiring less memory and less time for processing during program execution than would otherwise be required, and which does not require the at least one Java application to incorporate each and every Java class file prior to run time, the method comprising acts of:

the at least one Java application requesting at least some portion of a class that is external to the at least one Java application;

searching a native executable run time image for the external class portion, the run time image comprising a searchable library of pre-loaded and pre-parsed instructions that are dynamically linkable in a manner so that the pre-parsed instructions may be accessed during run time by any of the one or more Java applications as needed, thereby allowing the one or more Java applications to be developed separately and independently from the run time image;

locating pre-loaded and pre-parsed instructions corresponding to the external class portion within the run time image so that pre-loaded and pre-parsed instructions corresponding to the external class portion may be dynamically linked to the at least one Java application; and     executing the located pre-loaded and pre-parsed instructions from the run time image as part of the execution of the at least one Java application.

30. A method as recited in claim 29, the method further comprising acts of:

the at least one Java application requesting a particular portion of a particular class that is external to the at least one Java application;

at run time, translating the byte ordering of at least one class file that corresponds to the particular portion of the particular class that is external to the at least one Java application; and     identifying information contained within the at least one class file, including information about any constants, fields, or methods defined within the at least one class file.

31. A method as recited in claim 29, wherein the run time image comprises a dynamic link library.

32. A method as recited in claim 29, wherein the run time image comprises instructions in a PE format.

33. A method as recited in claim 29, wherein the run time image is stored on a nonvolatile storage device.

34. A method as recited in claim 29, wherein the Java virtual machine comprises software executed by a processor from a computer-readable medium.

35. A computer program product for use in a computer system having one or more program modules that include a Java virtual machine, one or more Java applications, and one or more Java class files, the computer program product implementing a method of executing at least one of the one or more Java applications without having to load and parse each and every Java class file used by the at least one Java application, thereby requiring less memory and less time for processing during program execution than would otherwise be required, and which does not require the at least one Java application to incorporate each and every Java class file prior to run time, wherein the computer program product comprises a computer readable medium carrying computer executable instructions for implementing the method, and wherein the method comprises steps for:

determining that at least some portion of a class referenced by the at least one Java application is external to the at least one Java application;

dynamically linking the external class portion to the at least one Java application from a native executable run time image comprising pre-loaded and pre-parsed instructions, wherein the pre-loaded and pre-parsed instructions may be accessed during run time by any of the one or more Java applications as needed, thereby allowing the one or more Java applications to be developed separately and independently from the run time image; and     using pre-loaded and pre-parsed instructions from the dynamically linked external class portion during the execution of the at least one Java application.

36. A computer program product as recited in claim 35, wherein the method further comprises steps for:

determining that a particular portion of a particular class referenced by the at least one Java application is external to the at least one Java application;

at run time, loading at least one class file that corresponds to the particular portion of the particular class that was determined to be external to the at least one Java application and accounting for any differences in byte order at the virtual machine; and parsing the at least one class file into individually parsed instructions derived from the one or more class files.

37. A computer program product as recited in claim 35, wherein the run time image comprises a dynamic link library.

38. A computer program product as recited in claim 35, wherein the run time image comprises instructions in a PE format.

39. A computer program product as recited in claim 35, wherein the run time image is stored on a nonvolatile storage device.

40. A computer program product as recited in claim 35, wherein the Java virtual machine comprises software executed by a processor from a computer-readable medium.

41. A computer program product for use in a computer system having one or more program modules that include a Java virtual machine, one or more Java applications, and one or more Java class files, the computer program product implementing a method of executing at least one of the one or more Java applications without having to load and parse each and every Java class file used by the at least one Java application, thereby requiring less memory and less time for processing during program execution than would otherwise be required, and which does not require the at least one Java application to incorporate each and every Java class file prior to run time, wherein the computer program product comprises a computer readable medium carrying computer executable instructions for implementing the method, and wherein the method comprises acts of:

the at least one Java application requesting at least some portion of a class that is external to the at least one Java application;

searching a native executable run time image for the external class portion, the run time image comprising a searchable library of pre-loaded and pre-parsed instructions that are dynamically linkable in a manner so that the pre-parsed instructions may be accessed during run time by any of the one or more Java applications as needed, thereby allowing the one or more Java applications to be developed separately and independently from the run time image;

locating pre-loaded and pre-parsed instructions corresponding to the external class portion within the run time image so that pre-loaded and pre-parsed instructions corresponding to the external class portion may be dynamically linked to the at least one Java application; and executing the located pre-loaded and pre-parsed instructions from the run time image as part of the execution of the at least one Java application.

42. A computer program product as recited in claim 41, wherein the method further comprises acts of:

the at least one Java application requesting a particular portion of a particular class that is external to the at least one Java application;

at run time, translating the byte ordering of at least one class file that corresponds to the particular portion of the particular class that is external to the at least one Java application; and identifying information contained within the at least one class file, including information about any constants, fields, or methods defined within the at least one class file.

43. A computer program product as recited in claim 41, wherein the run time image comprises a dynamic link library.

44. A computer program product as recited in claim 41, wherein the run time image comprises instructions in a PE format.

45. A computer program product as recited in claim 41, wherein the run time image is stored on a nonvolatile storage device.

46. A computer program product as recited in claim 41, wherein the Java virtual machine comprises software executed by a processor from a computer-readable medium.

* * * * *

UNITED STATES PATENT AND TRADEMARK OFFICE
CERTIFICATE OF CORRECTION

PATENT NO. : 6,349,344 B1
DATED : February 19, 2002
INVENTOR(S) : David M. Sauntry and Michael E. Markley It is certified that error appears in the above-identified patent and that said Letters Patent is hereby corrected as shown below:

Column 2,
Line 28, change "trough" to -- through --

Column 3,
Line 43, after "RAM" insert -- , --

Column 6,
Line 30, change "ran-time" to -- run-time --

Column 7,
Line 39, change "bum" to -- burn --

Signed and Sealed this

Fourth Day of June, 2002

*Attest:*

JAMES E. ROGAN
*Attesting Officer*    *Director of the United States Patent and Trademark Office*